Patented May 31, 1949

2,471,453

UNITED STATES PATENT OFFICE 2,471,453

PREPARATION OF TERPENE PHENOLS

Alfred L. Rummelsburg, Wilmington, Del., assignor to Hercules Powder Company, Wilmington, Del., a corporation of Delaware No Drawing. Application November 7, 1944,
Serial No. 562,378

2 Claims. (Cl. 260—62)

This invention relates to terpene-substituted phenols and more particularly to a method of producing terpene-substituted phenols by condensing a cyclic terpene or dihydroterpene and a phenol.

It is well known that terpenes will react with phenols in the presence of certain catalysts such as sulfuric acid, paratoluene sulfonic acid, aqueous hydrochloric acid, metal halides, etc., to form terpene phenyl ethers, or a mixture of terpene phenyl ether and terpene-substituted phenol, the latter being present only in small amounts. Terpene-substituted phenols have been formed by reacting a terpene halide with a phenol in the presence of a metal halide. This method has the disadvantage that a terpene halide must be used as the starting material. Although terpene-substituted phenols result when terpenes are reacted with phenols in the presence of concentrated sulfuric acid, the product consists of a mixture of terpene phenyl ether and terpene-substituted phenols. Moreover, this catalyst is disadvantageous in that sulfonic acids are simultaneously formed.

Now in accordance with this invention it has been found that considerable improvement in the reaction of a cyclic terpene or dihydroterpene with a phenol may be obtained by carrying out the reaction in the presence of anhydrous hydrogen fluoride to form a terpene-substituted phenol or dihydroterpene-substituted phenol condensate in high yield.

The following examples are illustrative of the method used in accordance with this invention to form a terpene- or dihydroterpene-substituted phenol. All parts and percentages given in the examples represent parts and percentages by weight.

Example I

One hundred thirty parts of anhydrous liquid hydrogen fluoride were stirred into a solution of 700 parts of phenol in 1200 parts of benzene contained in a steel autoclave while cooling to 15° to 18° C. Seven hundred parts of a mixture of terpenes, containing about 75% monocyclic terpenes and 25% of a p-cymene-p-menthane mixture, were added to the above agitated mixture during 10 minutes at a temperature of 18° to 25° C. The batch was then agitated at 30° to 40° C. for 3 hours.

Approximately one-third of the reaction mixture (920 parts) was removed, washed with water and then refluxed for one hour with a solution of 165 parts of potassium hydroxide in 850 parts of ethanol. The mass was acidified with aqueous 50% sulfuric acid and water washed. The benzene solution was then evaporated, using a final bath temperature of 210° C., and a pressure of 25 mm. in order to remove the solvent, unreacted terpene and phenol. A yield of 224 parts was obtained which would correspond to 73% of the theoretical yield on the basis of terpene. The product was a solid resin, which had a hydroxyl content of 6.3%, a melting point of 67° C., and a molecular weight of 358.

The remainder of the reaction mixture was heated to 60° to 70° C. for 3 hours. After cooling to 15° to 20° C. five hundred parts (about 18% of the total reaction mixture) of this material were then removed and treated as described above. A yield of 170 parts was obtained which corresponds to 100% of the theoretical yield on a terpene basis. The product was a solid resin having a hydroxyl content of 6.7% (theory 7.4%), a melting point of 87° C. and a molecular weight of 373 (theory 230 for monoterpene-substituted phenol). The molecular weight indicates that the product contains a substantial portion of diterpene-diphenol (molecular weight of 460).

About 100 parts of the above product were distilled at 1 mm. pressure to a final bath temperature of 245° C. About 35 parts of distillate were collected at a vapor temperature of 150° to 190° C. It was a viscous liquid which had a hydroxyl content of 5.8% and a molecular weight of 240. The residue from this distillation was a solid which had a melting point of 110° C., a hydroxyl content of 7.3% and a molecular weight of 430.

Example II

Example I was repeated except that the phenol was replaced with a mixture of commercial cresols and the whole of the reaction mixture was heated to 60° to 70° C. for 3 hours before isolating the product. A yield of 950 parts of condensate was obtained which had a melting point of 70° C. and a hydroxyl content of 6.0%.

Example III

Dipentene containing small amounts of p-cymene was hydrogenated at 60° to 80° C. and a hydrogen pressure of 30 to 50 lb./sq. in. using Raney nickel as the catalyst. The product contained approximately 60% of carvomenthene and approximately 30% of a p-menthane-p-cymene mixture as well as small amounts of unhydrogenated terpenes.

One hundred thirty parts of anhydrous hydrogen fluoride were introduced into a steel autoclave containing an agitated solution of 700 parts of phenol in 1200 parts of benzene while cooling to 15° to 18° C. Seven hundred parts of the carvomenthene mixture prepared above were added during 10 minutes at 18° to 25° C. with continued agitation. The batch was then agitated for 3 hours at 35° to 40° C.

About 30% of the reaction mixture (815 parts) was removed, washed with water, and then refluxed with a solution of 180 parts of potassium hydroxide in 1000 parts of ethanol. After acidifying with aqueous 50% sulfuric acid, and water washing, the solvent and unreacted constituents were removed by distillation at 25 mm. pressure to a bath temperature of 210° C. A yield of 143 parts was obtained, which corresponds to 62% of the theoretical yield. The product was a liquid, which crystallized on standing, and had a hydroxyl content of 5.8% (theory 7.3%).

The remainder of the reaction mixture was heated to 60° to 70° C. for 2.5 hours. After cooling to 15° to 20° C., five hundred parts (about 18% of the total reaction mixture) of this material were removed and worked up as described above. A yield of 142 parts was obtained which corresponds to 100% of the theoretical yield based on the carvomenthene and terpene present in the reaction mixture. The product was a liquid which crystallized on standing, and had a hydroxyl content of 7.6% (indicating that the product was a pure terpene-phenol condensate).

*Example IV*

Carvomenthene was prepared by catalytically hydrogenating pure dipentene at 60° C. in the presence of an equal weight of water with hydrogen at atmospheric pressure. The catalyst used was Adam's platinum oxide. The hydrogenation was continued until one double bond of the dipentene had been saturated.

Twelve parts of anhydrous hydrogen fluoride were added to a mixture of 50 parts of phenol, 50 parts of the above carvomenthene and 50 parts of cyclohexane at 5° C. The batch was agitated for 3 hours at 0° to 10° C. The reaction mixture was then washed with water and diluted with benezene to reduce the viscosity. The solvent and unreacted constituents were removed by distillation under a pressure of 20 mm. to a bath temperature of 200° C. A yield of 64 parts of a solid resin which had a hydroxyl content of 4.7% was obtained. The theoretical hydroxyl content of menthylphenol is 7.3% indicating that the product was a mixture apparently containing approximately 64% of terpene-substituted phenol and approximately 36% of terpene phenyl ether.

*Example V*

Two hundred parts of anhydrous liquid hydrogen fluoride were stirred into a solution of 500 parts of phenol and 500 parts of benzene contained in a steel autoclave, while cooling to 10° to 15° C. A mixture consisting of 500 parts of camphene and 200 parts of benzene were gradually added during 0.5 hour with continued agitation and cooling to 10° to 15° C. The temperature was then increased to 60° to 70° C. for a period of 3 hours with continued agitation. After cooling to 15° to 20° C., the reaction mixture was washed with water to remove the catalyst and then was refluxed for 1 hour with a solution of 400 parts of potassium hydroxide in 950 parts of alcohol. The mixture was acidified with aqueous 50% sulfuric acid and then was washed with water. Solvent, unreacted terpene and excess phenol were removed by distillation, using a final bath temperature of 195° C., and a pressure of 20 mm. The residue, consisting of 760 parts of condensate, was a pale-colored resin.

About 200 parts of the above condensate were distilled at 1 mm. pressure. A distillate of about 120 parts was collected at a vapor temperature of 149° to 182° C. It was a viscous liquid which had a hydroxyl content of 7.6% and a molecular weight of 240. The residue from this distillation was a solid resin which had a hydroxyl content of 4.9% and a molecular weight of 415.

In the above examples the hydroxyl content was determined by the Zerewitinoff method and the molecular weight by the Rast method. The melting points were determined using the Hercules Drop method.

The condensation reaction between the cyclic terpene or dihydroterpene and the phenol is preferably carried out by absorbing gaseous hydrogen fluoride in the phenol to be reacted with the terpene or dihydroterpene, desirably in the presence of an inert solvent, in order to reduce the viscosity of the reaction mixture. The terpene is added to the mixture during a suitable period with agitation, while controlling the temperature by external means, and while controlling the rate of addition of terpene. After the addition of the terpene, the homogeneous mixture is agitated for another suitable period of time sufficient to complete the reaction between the terpene and the phenol. The catalyst is then removed by washing with water or by other methods, and the reaction mixture is subjected to steam and/or vacuum distillation in order to remove the solvent and unreacted constituents, leaving the condensate as a residue.

If desired the cyclic terpene or dihydroterpene and phenol to be reacted in accordance with this invention may be mixed together, desirably in the presence of an inert solvent, and then the hydrogen fluoride introduced into the mixture. However, this procedure is less desirable than when the terpene is added to the hydrogen fluoride-treated phenol as previously described, since it is more difficult to control the temperature of the reaction when the hydrogen fluoride is added to the terpene-phenol or menthene-phenol mixture.

Any suitable apparatus may be used in carrying out the reaction of this invention. The use of a closed system such as a suitable metal autoclave, provided with mechanical agitation, is desirable. Copper flasks may be utilized for reactions carried out below 20° C., and at atmospheric pressure.

In carrying out the condensation reaction between a cyclic terpene or dihydro terpene and a phenol to form the substituted phenol, it is usually desirable to employ at least one mole of phenol for each mole of cyclic terpene or dihydroterpene. Under these conditions, the introduction of one terpene substituent into the phenol will, in general, predominate. However, by utilizing more than one mole of terpene for each mole of phenol, the introduction of more than one terpene substituent can be accomplished. While any ratio of phenol to terpene may be used, it is preferable to use about 0.75 to about 2 moles of phenol for each mole of terpene.

The reaction temperature that may be employed in reacting a cyclic terpene or dihydroterpene with a phenol to form the substituted phenols may range from about −10° C. to about 150° C., and the temperature range is preferably from about 0° C. to about 90° C. The reaction period may range from about 0.5 to about 24 hours and is preferably from about 1 hour to about 8 hours.

The catalyst may be removed from the reaction mixture by washing the reaction mixture with water at a temperature desirably between about 20° C. and about 100° C. The use of water at this temperature favors the decomposition of the hydrogen fluoride reaction complex, and hence facilitates the removal of the catalyst.

The catalyst may also be removed by methods other than by washing with water. For example, the hydrogen fluoride may be distilled from the reaction mixture by heating to temperatures of about 130° to 150° C., using reduced pressure if necessary. Or, the reaction mixture may be treated with a suitable salt of hydrogen fluoride such as sodium fluoride, potassium fluoride, ammonium fluoride, and calcium fluoride, to form acid fluoride salts such as $NaHF_2$, etc., which may be filtered off.

Condensates prepared in accordance with this invention may in some cases contain traces of combined hydrogen fluoride after the removal of the free hydrogen fluoride by any of the abovementioned methods. However, heat treatment of the products to temperatures of from about 150° to about 320° C., if desired in an inert atmosphere, will remove this combined hydrogen fluoride as free hydrogen fluoride. This free hydrogen fluoride will distill from the heated product with or without simultaneous sparging with a suitable inert gas such as steam, nitrogen, carbon dioxide, etc.

The quantity of catalyst that may be used in catalyzing the reaction between a cyclic terpene or menthene and a phenol to produce the substituted phenols may vary from about 1% to about 200% of the weight of the reaction mixture and is preferably from about 2% to about 50%.

In order to produce the substituted phenols in accordance with this invention, it is essential that the hydrogen fluoride used as the catalyst be substantially anhydrous as an aqueous hydrogen fluoride will produce a condensate which is a mixture of terpene phenyl ether and terpene-substituted phenol instead of the desired terpene-phenol.

In this specification and in the claims appended hereto, by the term "substantially anhydrous hydrogen fluoride," I mean hydrogen fluoride which is substantially free from water, such as, for example, liquid or gaseous hydrogen fluoride which contains no or no more than a trace of dissolved or intermingled water, or hydrogen fluoride containing not more than about 2 to 3%, and preferably not more than about 0.5% by weight of water. Likewise, the present invention contemplates the absence of water in the reaction mixture in amounts greater than these limits, since there is no advantage in using anhydrous hydrogen fluoride if water is present in substantial amounts in the reaction mixture by reason of its inclusion from other sources.

Phenols which may be employed in the present invention, using any cyclic terpene or dihydroterpene and using the conditions of temperature and time hereinbefore set forth, are any chemical substance having a phenolic characteristic, as, for example, phenol, tar acids, cresols, xylenols, alkyl-, aralkyl- and aryl-substituted phenols such as p-tertiary butyl phenol, p-tertiary amyl phenol, p-phenyl phenol, ortho- and para-cyclohexyl phenol, monochloro phenols, nitro phenols, naphthols, dihydroxy benzenes such as pyrocatechol, resorcinol, dihydroxy naphthalenes, dihydroxy anthracenes, dihydroxy diphenyls, 2,2-bis(p-hydroxyphenyl)propane, and alkoxy phenols such as guaiacol, etc.

Substantially inert solvents, such as benzene, toluene, xylene, para-cymene, cyclohexane, paramenthane, carbon tetrachloride, ethylene dichloride, chloroform, etc., may be used during the condensation reaction in order to reduce the viscosity of the reaction mixture and facilitate satisfactory mixing of the components.

Generally the unsaturated cyclic terpene hydrocarbons are useful in accordance with this invention. The cyclic terpene hydrocarbons may be conveniently referred to as those cyclic terpene hydrocarbons having an empirical formula of $C_{10}H_{16}$. Suitable monocyclic terpenes are dipentene, terpinolene, alpha-terpinene, beta-terpinene, gamma-terpinene, alpha-phellandrene, beta-phellandrene, limonene, crithmene, 2,4(8)-menthadiene, 2,4(5)-menthadiene, 2,5-menthadiene, 3,8-menthadiene, and 2,8-menthadiene. The bicyclic terpenes containing one double bond which readily isomerize to terpenes containing two double bonds are also operable in accordance with this invention and typical examples are alpha-pinene, beta-pinene, carenes, and thujenes. Bicyclic terpenes containing one double bond such as camphene, bornylene, alpha-fenchene, beta-fenchene, and gamma-fenchene, which do not isomerize to mono-cyclic terpenes containing two double bonds may be used, in which case the product is a bornyl-, isobornyl-, etc., substituted phenol. Mixtures of the various cyclic terpenes may also be used.

Any monocyclic dihydroterpene having the formula $C_{10}H_{18}$ may also be used in accordance with the reaction of the present invention. Suitable dihydro terpenes having an empirical formula of $C_{10}H_{18}$ besides the carvomenthene shown in the examples are the para-menthenes, such as 2-para-menthene, 3-para-menthene, 1(7)-para-menthene 4(8)-para-menthene and 8-para-menthene. When a menthene is condensed with a terpene, the product is substantially a menthyl-phenol.

The para-menthene type of dihydroterpenes may be conveniently produced by hydrogenating dipentene using a hydrogen pressure of about atmospheric pressure to about 2000 lb./sq. in. and temperatures between about 20° C. and about 200° C. in the presence of a suitable hydrogenation catalyst, such as reduced platinum, Adam's platinum oxide, activated nickel, Raney nickel, activated iron, etc. They may be also obtained by the dehydration of dihydroterpineols.

After the condensation has been completed between a terpene and a phenol in the presence of anhydrous hydrogen fluoride as a catalyst, and the catalyst has been removed, the resulting mixture may be subjected to steam and/or vacuum distillation, in order to remove small amounts of unreacted products and solvents. If desired, the condensate which remains after removal of solvent and unreacted constituents can be further distilled at pressures of 30 mm., or less, whereby the volatile terpene-substituted phenols are removed.

The terpene-substituted phenols which are obtained in accordance with the process of this invention range in color from about D to about X on the Rosin Color Scale. The products which are dark in color may be refined in solution, using such solvents as benzene and toluene, with adsorbents such as fuller's earth, bauxite, activated carbon, natural and synthetic magnesium silicates to produce high yields of resinous product having much lighter color.

The products of this invention may be used directly or may be reacted with aldehydes to form other synthetic resins also used in the manufacture of varnishes, etc. They are also useful as chemical intermediates.

What I claim and desire to protect by Letters Patent is:

1. A process of preparing a terpene-substituted phenol which comprises reacting a menthene and a phenol in the presence of substantially anhydrous hydrogen fluoride and of a solvent, inert under the reaction conditions, at a temperature of about 0° C. to about 90° C., said phenol containing at least one unsubstituted position in the ring, and being present in the reaction mixture in the ratio of from about 0.75 to about 2 moles per mole of menthene.

2. A process of preparing a terpene-substituted phenol which comprises reacting a para-menthene and a phenol in the presence of substantially anhydrous hydrogen fluoride and of a solvent, inert under the reaction conditions, at a temperature of about 0° C. to about 90° C., said phenol containing at least one unsubstituted position in the ring, and being present in the reaction mixture in the ratio of from about 0.75 to about 2 moles per mole of para-menthene.

ALFRED L. RUMMELSBURG.

REFERENCES CITED

The following references are of record in the file of this patent:

UNITED STATES PATENTS

| Number | Name | Date |
|---|---|---|
| 1,469,709 | Wuyts | Oct. 2, 1923 |

OTHER REFERENCES

Calcott et al., Jour. Am. Chem. Soc., vol. 61, pages 1010–1017, May 1939.